M. J. BREEN.
TOOL HOLDER.
APPLICATION FILED MAY 23, 1919.
1,342,983.
Patented June 8, 1920.
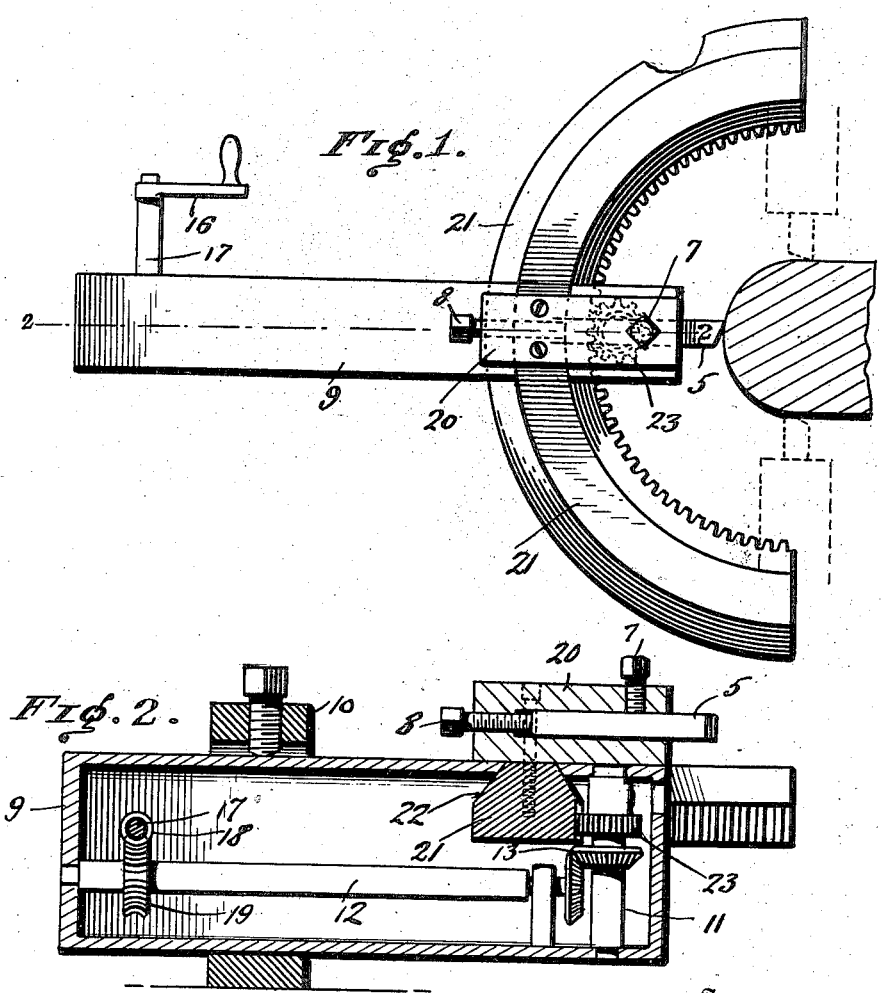
Inventor
Michael J. Breen
By Max A. Schmidt
Attorney

UNITED STATES PATENT OFFICE.

MICHAEL J. BREEN, OF LOUISVILLE, KENTUCKY.

TOOL-HOLDER.

1,342,983.  Specification of Letters Patent.  Patented June 8, 1920.

Application filed May 23, 1919. Serial No. 299,221.

*To all whom it may concern:*

Be it known that I, MICHAEL J. BREEN, a citizen of the United States, residing at Louisville, in the county of Jefferson and State of Kentucky, have invented certain new and useful Improvements in Tool-Holders, of which the following is a specification.

The tool holder which is the subject matter of the present application for patent is designed for use in connection with ordinary lathes or boring machines to turn curved surfaces, and the invention has for its object to provide a very simple and efficient device for this purpose, the same consisting in a novel combination and arrangement of parts to be hereinafter described and claimed.

In order that the invention may be better understood, reference is had to the accompanying drawing, forming a part of this specification, and in said drawing, Figure 1 is a plan view of the invention, and Fig. 2 is a longitudinal section on the line 2—2 of Fig. 1.

The preferred embodiment of the invention has been disclosed, but it will be understood that various changes and modifications may be made without a departure from the spirit and scope thereof as claimed hereinafter.

Referring specifically to the drawing, 5 denotes a cutting tool of conventional form which is carried by a supporting block 20, and is held in a recess in the latter by a set screw 7. The inner end of the tool is engageable by a screw 8 for longitudinal adjustment as usual.

At 9 is shown an elongated, hollow base member adapted to be clamped in the tool post 10 of the lathe or other machine. The tool post is carried by a slide rest as usual, and as these parts are well known they need not be described and illustrated in detail.

On the inside of the member 9 are suitably supported shafts 11 and 12 positioned at a right angle to each other, and geared together by a bevel gearing 13.

The shaft 11 is operated by a crank handle 16 on a shaft 17 having a worm 18 which is in mesh with a worm wheel 19 on the shaft 12. The shaft 17 extends from the member 9, and the crank handle 16 is on the outside of the latter.

The tool supporting block 20 is secured to the top of a segmental rack 21 midway between the ends of the latter. This rack is slidably supported by the member 9, by seating in side openings 22 in the latter. The rack 21 and the openings 22 are shaped to produce a dovetail construction whereby the rack is prevented from rising up off the member 9 when the device is in use.

The teeth of the rack 21 are on the concave side thereof, and they are in mesh with a pinion 23 fastened on the shaft 11. It will therefore be seen that when the shaft is turned a partial revolution in alternate opposite directions, the rack swings back and forth in the direction of its length, and as it carries the block 20 supporting the tool 5, the latter is carried back and forth in a curved path concentric to the rack 21, and hence the cutting point of the tool 5, as shown dotted in Fig. 1, makes a convex cut as it is on the concave side of the rack.

In operation, the cutting tool is moved to the work by the slide rest and then a cut is made by turning the crank handle 16. The cutter is then again advanced by the slide rest and another cut is made, and so on until the piece is finished. The work will be held in the lathe and revolved in the usual manner.

I claim:

The combination of a base member having a guide opening through its top and opposite sides, a curved rack seating slidably in said opening and having its upper face exposed through the top guide opening, a pinion in mesh with the rack for sliding the same, a shaft carrying the pinion and having one end supported in an opening in the top of the base member, driving means for the pinion shaft, a cutting tool, and a support for said tool carried by that portion of the rack which is exposed through the aforesaid guide opening in the top of the base member.

In testimony whereof I affix my signature.

MICHAEL J. BREEN.